INVENTOR
EDWARD W. PARRISH

ATTY

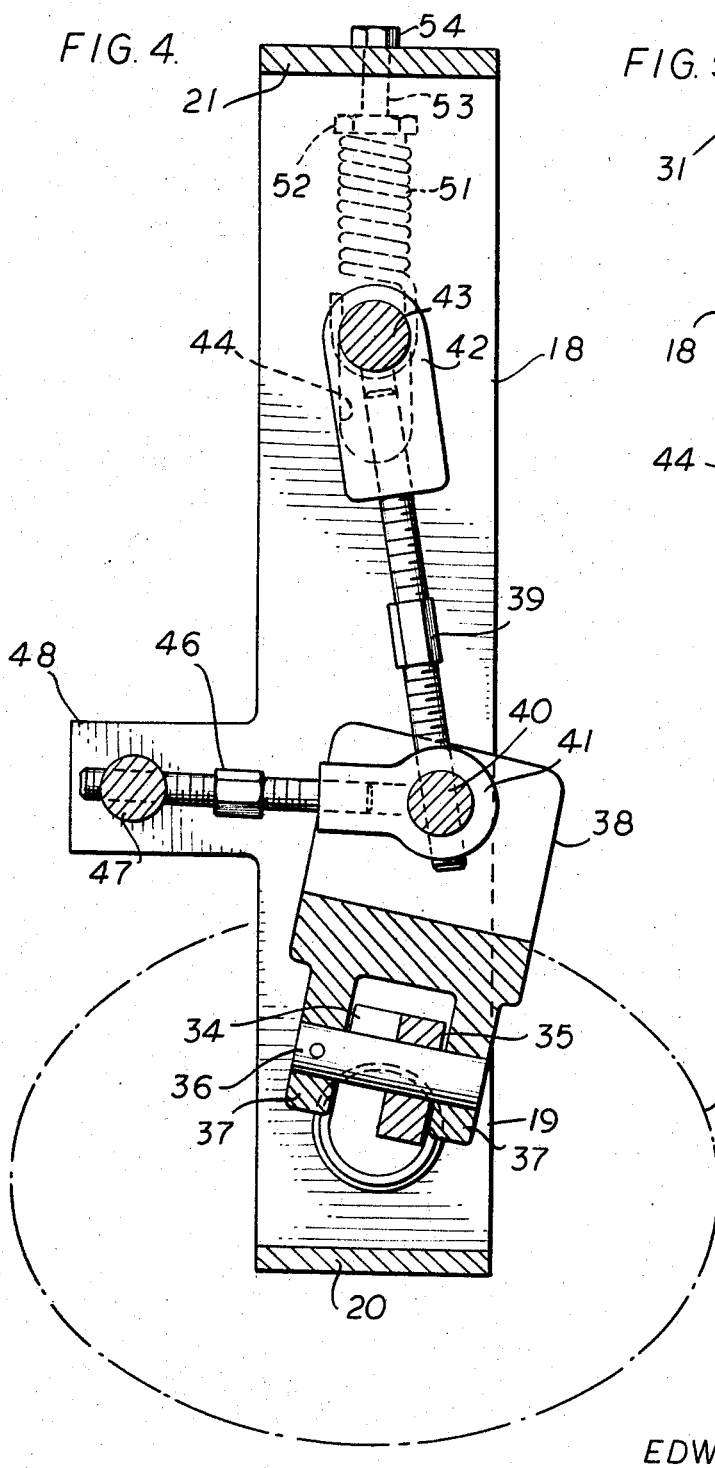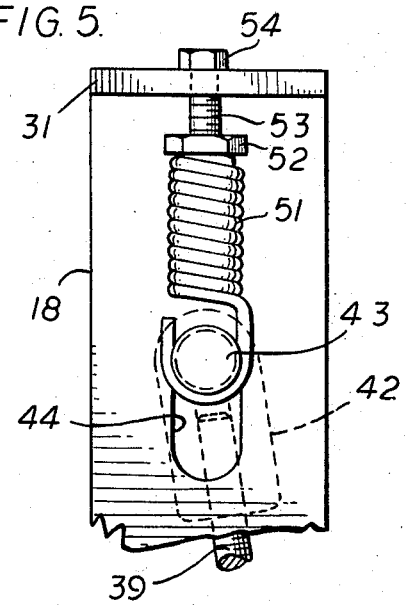

United States Patent Office 3,425,494
Patented Feb. 4, 1969

3,425,494
ROOT CROP HARVESTER
Edward W. Parrish, Westmont, Ill., assignor to International Harvester Company, Chicago, Ill., a corporation of Delaware
Filed Nov. 1, 1966, Ser. No. 591,158
U.S. Cl. 171—58                              9 Claims
Int. Cl. A01d 13/00

This invention relates to harvesters for root crops and particularly to means for removing the roots from the ground.

An object of the invention is the provision of improved mechanism for digging root crops such as beets and the like.

Another object of the invention is the provision, in a puller wheel unit for digging beets and the like, of novel means for adjusting the angular relation of the puller wheels in accordance with variations in crop and soil conditions.

Another object of the invention is the provision, in a puller wheel assembly for beets and the like wherein the wheels converge downwardly and penetrate the ground at opposite sides of the growing crop, of novel means for adjusting the angle of convergence of the wheels as well as the longitudinal position of the convergence point.

Other objects and advantages of the invention will become clear from the following detailed description when read in conjunction with the accompany drawings wherein:

FIGURE 4 is an enlarged sectional view of the puller wheel supporting member of this invention; and FIGURE 5 is a detail of a portion of the structure shown in FIGURES 2 and 3.

Figure 1:
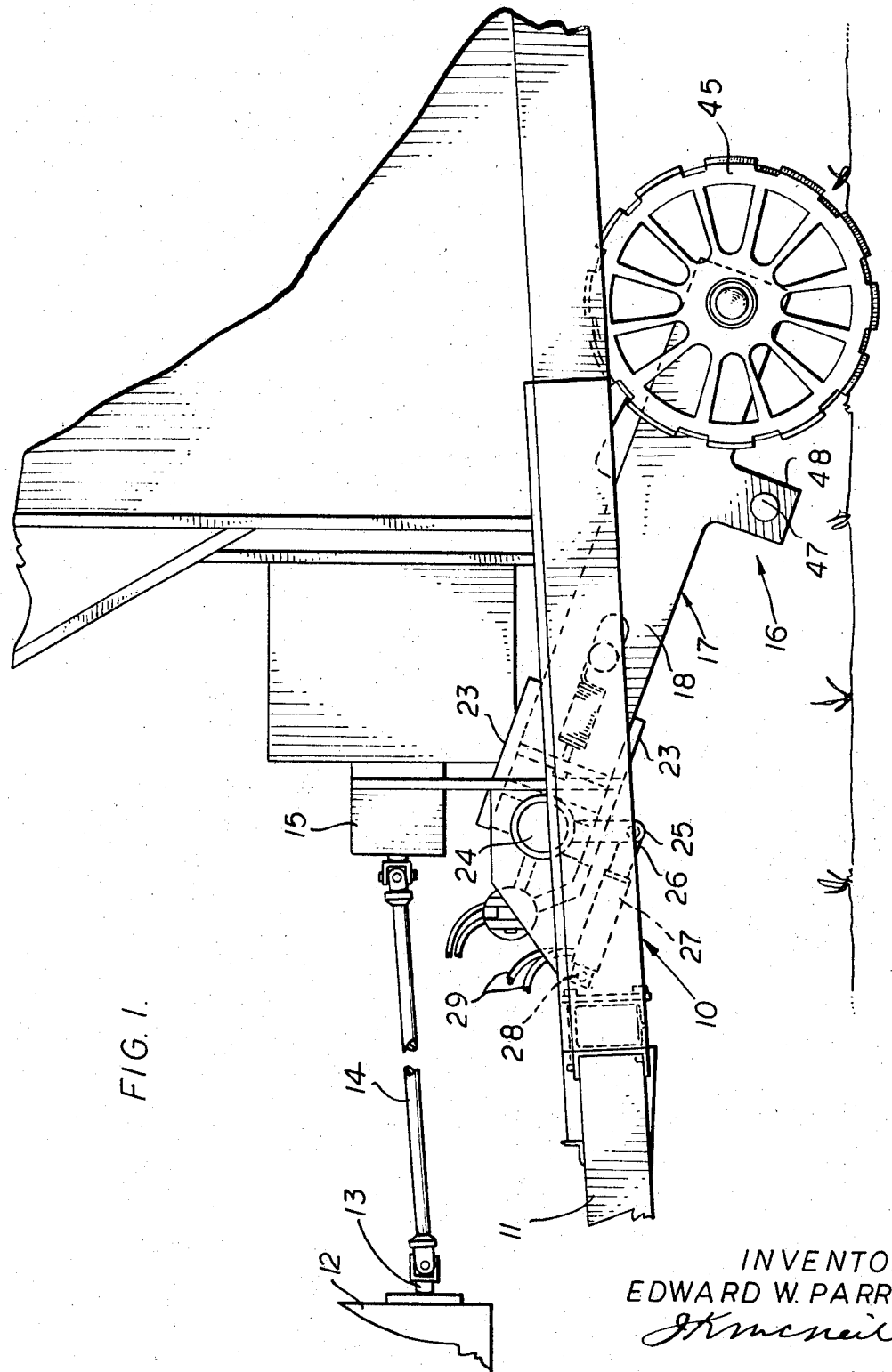
FIGURE 1 is a diagrammatic view in side elevation of a portion of a beet harvesting machine having a puller wheel unit mounted thereon incorporating the features of this invention.

The harvesting machine a portion of which is illustrated in FIGURE 1 is particularly adapted for the harvesting of sugar beets and comprises a traveling frame 10 mounted on supporting wheels, not shown, and having a hitch structure 11 adapted for connection to a tractor 12 to be propelled over the ground, the tractor being provided with conventional power take-off means 13 connected by a drive-shaft 14 with gearing carried by the frame of the harvesting machine, in an enclosure 15, for transmitting power to operate driven elements of the harvesting machine, not shown.

The beet harvesting machine with which this invention is concerned is of the type disclosed in U.S. Patent 3,191,686 and includes a puller wheel unit 16 which comprises a rearwardly extending supporting member or post 17, generally rectangular in shape, having parallel side members 18 converging at their rear ends to provide angled sections 19 and a cross bar 20 and having a cross piece 21 at their upper ends with lateral extensions or ears 22.

The manner in which the tool supporting member 17 is connected to the implement frame 10 forms no part of this invention but may be understood to include a pair of plates 23 affixed to side bars 18 and extending forwardly therefrom. The forward ends of plates 23 are mounted upon a shaft 24 rotatable on the frame and having an arm 25 extending therefrom for connection to a piston rod 26 slidable in a cylinder 27 pivoted at 28 on the frame and supplied with hydraulic fluid under pressure through hose lines 29 from a source, not shown, on the tractor 12, extension of the piston rod 26 in the cylinder serving to raise the puller wheel assembly 16.

The downwardly converging side sections 19 of supporting member 17 are provided with sleeves 30 to receive for universal pivotal movement a knuckle 31. Knuckles 31 are mounted upon downwardly and rearwardly diverging wheel carrying members in the form of stub shafts 32 and 33, the inners ends of which are provided with overlapping portions 34 and 35, respectively, having a pivot-forming connection with a pin 36. Pin 36 is carried by a pair of lugs 37 secured to a movable member in the form of a yoke 38 slidably received between side plates 18 for longitudinal movement with respect thereto. Yoke 38 establishes an operative connection between the inner ends of wheel carriers 32 and 33, and an adjustable member in the form of a turnbuckle 39 having a threaded connection at one end to a pin 40 carried in openings in the arms of yoke 38, upon which is also mounted a clevis 41.

The other end of adjustable member 39 is adapted for adjustable connection to a sleeve 42 mounted on a shaft 43 projecting through and slidable longitudinally of supporting member or post 17 within the confines of longitudinally extending slots 44 in side bars 18.

Figure 2:
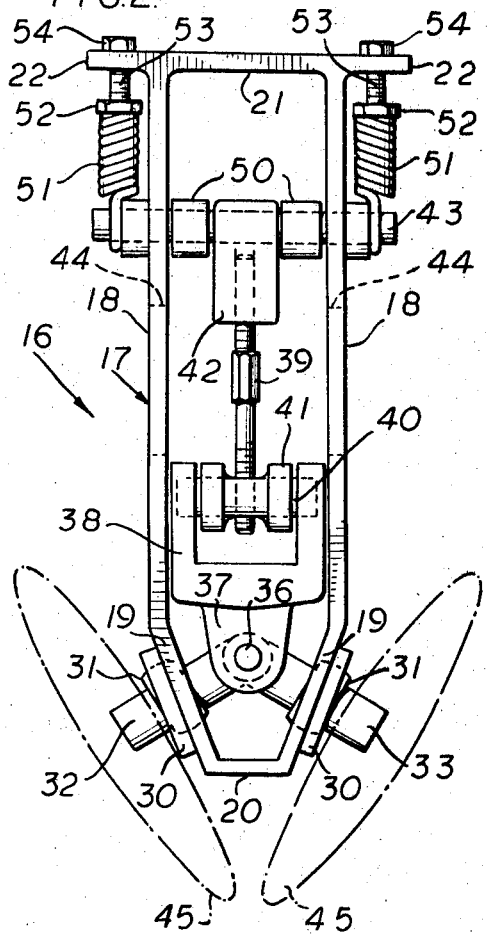
FIGURE 2 is a plan view on a smaller scale of a portion of the puller wheel assembly shown in FIGURE 1, illustrating the angular relationship of the wheels prior to operation in a crop of relatively small beets.
Figure 3:
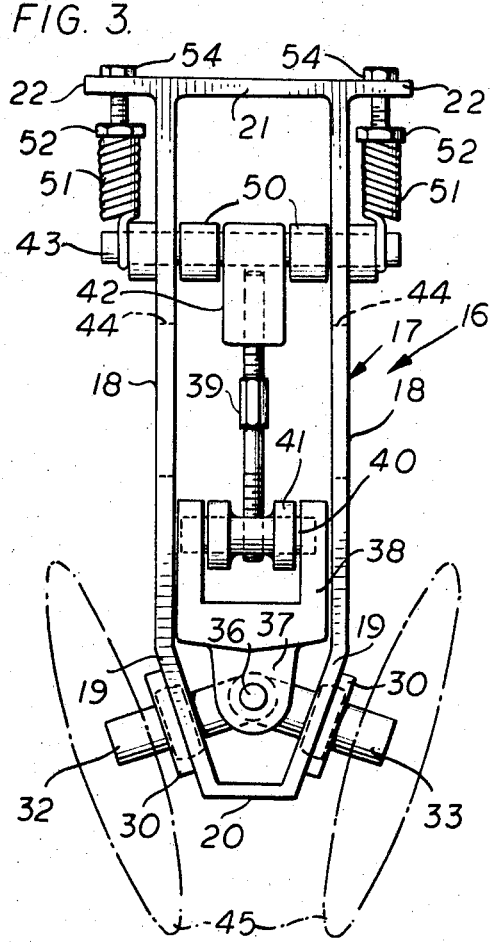
FIGURE 3 is a view similar to FIGURE 2 illustrating the converging angle of the wheels preparatory to operating upon larger beets.

A pair of puller wheels 45 are mounted on the ends of stub shafts 32 and converge rearwardly and downwardly at angles determined by the angle of divergence of shafts 32 and 33. Variation in the angle of convergence of wheels 45 is effected by varying the position of movable yoke 38 to shift the connecting means between the inner ends of stug shafts 32 and 33, represented by pivot pin 36, and this is accomplished by adjusting the length of turnbuckle 39 to vary the angle of convergence of the puller wheels between positions such as that shown in FIGURE 2 and that shown in FIGURE 3.

Further variation in the point of convergence of the puller wheels is accomplished by the provision of another adjustable member in the form of a turnbuckle 46 threaded at one end for reception in a threaded opening provided in a shaft 47 mounted in projections 48 extending downwardly and forwardly from side plates 18, the other end of turnbuckle 46 being threaded for reception in a threaded opening provided in clevis 41.

Adjustment of turnbuckle 46 swings movable yoke member 38 transversely of side plates 18 and shifts the connecting pin 36, swinging stub shafts 32 and 33 to move the point of convergence of puller wheels 45 in a direction parallel to the axis of pivot pin 36, transversely of supporting member 17.

Cushioning means is provided to allow the converging ends of wheels 45 to move outwardly and avoid damage to the wheels when a rock or other rigid obstruction becomes wedged therebetween. To accomplish this purpose the upper or forward end of turnbuckle 39 is connected to the rod or shaft 43 slidable in slots 44. Sleeve 42 to which the forward end of the turnbuckle is adjustably connected is pivoted on shaft 43 and is flanked by a pair of spacers 50. Each end of shaft 43 serves as the anchor for a coil spring 51, to the other end of which is secured a nut 52 adjustably receiving the threaded end of a bolt 53 passing through openings in ears 22 and provided with a head 54. The ground engaging ends of wheels 45 yield outwardly causing connecting pin 36, movable member 38 and shaft 43 to move rearwardly and downwardly against the action of springs 51, the tension on the springs being adjusted to maintain a selected convergent angle for the puller wheels under normal operating conditions.

It is believed that the construction and operation of the novel puller wheel assembly of this invention will be clearly understood from the foregoing description. It should likewise be understood that the invention has been described in its preferred embodiment and that modifications may be made therein without departing from the spirit of the invention or the scope of the appended claims.

What is claimed is:

1. In a puller wheel assembly for a root crop harvesting machine wherein a pair of laterally spaced converging wheels are mounted on a traveling frame to penetrate the ground at the sides of the roots to lift them from the ground during forward travel of the machine, a supporting member connected at one end to the frame, means for mounting said wheels on said supporting member comprising, spaced pivot openings provided in the other end of said supporting member, wheel-carrying members pivotally received in said openings and having said wheels mounted on their outer ends, connecting means between the inner ends of said wheel-carrying members, and adjustable means operatively connected at one end to said connecting means and at its other end to said supporting member and adjustable to shift said connecting means and adjust the angular relationship of said wheels.

2. The invention set forth in claim 1, wherein the connection of said adjustable means to said supporting member includes spring means accommodating shifting of said connecting means and change in the angular relationship of said wheels in response to abnormal operating conditions and independently of the operation of said adjustable means.

3. The invention set forth in claim 1, wherein said adjustable means is adjustable to shift said movable member generally longitudinally of said supporting member and another adjustable means is operatively connected to said connecting means and to said supporting member to shift said connecting means generally transversely of said supporting member.

4. The invention set forth in claim 3, wherein each of said adjustable means is a turnbuckle pivotally connected at one end to said supporting member and is operatively connected at its other end to said connecting means.

5. The invention set forth in claim 4, wherein said supporting member includes spaced elements and a movable member is slidably mounted between said elements, said movable member being mounted at one end on said connecting means and connected at its other end to each of said turnbuckles.

6. The invention set forth in claim 2, wherein said adjustable means is a turnbuckle and its connection to said supporting member includes a cross bar longitudinally slidable in slots provided in said supporting member, and springs connect said bar to the supporting member to resist sliding of the bar in said slots.

7. In a puller wheel assembly for a root crop harvesting machine wherein a pair of laterally spaced converging wheels are mounted on a traveling frame to penetrate the ground at the sides of the roots to lift them from the ground during the forward travel of the machine, a supporting member connected at one end to the frame, means for mounting said wheels on said supporting member comprising, spaced pivot openings provided in the other end of said supporting member, wheel shafts pivotally received in said openings and having said wheels rotatably mounted on their outer ends, pivot means connecting the inner ends of said shafts, an adjusting member pivotally mounted on said pivot means, and means mounting said adjusting member on said supporting member for movement longitudinally and transversely thereof to adjust the relative angular relationship of said wheels and hold them in selected adjusted positions.

8. The invention set forth in claim 7, wherein said means mounting said adjusting member on said supporting member comprises a pair of means adjustable in length, one of which extends generally parallel and the other generally transverse to said supporting member, one end of each of said means adjustable in length being connected at one end to said supporting member and the other end thereof to said adjusting member for selectively shifting the latter and said pivot means longitudinally and transversely of said pivot member.

9. The invention set forth in claim 8, wherein each of said means adjustable in length is a turnbuckle pivotally connected at one end to said supporting member and at its other end to said adjusting member.

References Cited

UNITED STATES PATENTS

| 1,182,149 | 5/1916 | Douglass | 171—58 XR |
| 2,993,545 | 7/1961 | Hammer et al. | 171—58 |

ANTONIO F. GUIDA, *Primary Examiner.*